US012693403B2

(12) United States Patent
Lessmann

(10) Patent No.: US 12,693,403 B2
(45) Date of Patent: Jul. 28, 2026

(54) BEAMVECTOR FILTERING AND DISAMBIGUATION USING VELOCITY PROFILE PATTERN FOR LOW-LEVEL RADAR EGO-MOTION

(71) Applicant: Aptiv Technologies AG, Schaffhausen (CH)

(72) Inventor: Stephanie Lessmann, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 282 days.

(21) Appl. No.: 18/545,949

(22) Filed: Dec. 19, 2023

(65) Prior Publication Data

US 2024/0201360 A1      Jun. 20, 2024

(30) Foreign Application Priority Data

Dec. 19, 2022     (EP) ..................................... 22214602

(51) Int. Cl.
| | | |
|---|---|---|
| *G01S 13/60* | (2006.01) | |
| *G01S 13/52* | (2006.01) | |
| *G01S 13/931* | (2020.01) | |

(52) U.S. Cl.
CPC .............. *G01S 13/60* (2013.01); *G01S 13/52* (2013.01); *G01S 13/931* (2013.01)

(58) Field of Classification Search
CPC .... G01S 13/931; G01S 13/584; G01S 13/343; G01S 13/345; G01S 13/18; G01S 13/89; G01S 13/52; G01S 13/64; G01S 7/356; G01S 7/354; G01S 2013/0254; G01S 2013/0245; G01S 2013/9318

USPC ........................... 342/195, 196, 70, 109, 104
See application file for complete search history.

(56) References Cited

U.S. PATENT DOCUMENTS

| | | | | |
|---|---|---|---|---|
| 4,450,444 A | * | 5/1984 | Wehner ................... | G01S 13/24 |
| | | | | 342/194 |
| 4,851,848 A | * | 7/1989 | Wehner ............... | G01S 13/9011 |
| | | | | 342/201 |
| 5,191,344 A | * | 3/1993 | Moreira .............. | G01S 13/9011 |
| | | | | 342/25 A |

(Continued)

FOREIGN PATENT DOCUMENTS

| | | |
|---|---|---|
| EP | 3035077 A1 | 6/2016 |
| EP | 3767325 A1 | 1/2021 |

OTHER PUBLICATIONS

Office Action received for EP22214602.9 dated Jun. 3, 2025, 11 pages.

(Continued)

*Primary Examiner* — Michael W Justice
(74) *Attorney, Agent, or Firm* — Miller Johnson

(57) ABSTRACT

Disclosed is a method for processing radar data of a vehicle. The method includes acquiring radar data from each of one or more radar antennas. The acquired radar data includes range rate (Doppler) data. The method includes determining beamvectors from the acquired radar data. The method includes filtering the beamvectors. The filtering includes removing, from the beamvectors, at least one of features corresponding to one or more moving targets or features corresponding to ambiguous range rate data, to determine filtered beamvectors. The method includes determining a characteristic of at least one of an environment of the vehicle or of the vehicle itself based on the filtered beamvectors.

14 Claims, 7 Drawing Sheets

(56) References Cited

U.S. PATENT DOCUMENTS

| | | | | |
|---|---|---|---|---|
| 5,910,785 | A * | 6/1999 | Normant | G01S 13/9004 342/194 |
| 6,072,419 | A * | 6/2000 | Normant | G01S 13/282 342/194 |
| 6,081,221 | A * | 6/2000 | Zrnic | G01S 13/95 342/134 |
| 6,822,606 | B2 * | 11/2004 | Ponsford | G01S 3/74 342/159 |
| 6,873,285 | B2 * | 3/2005 | Carrara | G01S 13/904 342/25 R |
| 6,940,450 | B2 * | 9/2005 | Blunt | G01S 13/284 342/134 |
| 7,106,250 | B2 * | 9/2006 | Blunt | G01S 7/2921 342/134 |
| 7,969,345 | B2 * | 6/2011 | Abatzoglou | G01S 13/9029 342/25 R |
| 9,274,219 | B2 * | 3/2016 | Lamb | G01S 13/904 |
| 9,465,103 | B2 * | 10/2016 | Sochen | G01S 13/58 |
| 9,494,682 | B2 * | 11/2016 | Choi | G01S 13/282 |
| 9,713,012 | B2 * | 7/2017 | Farshchian | G01S 7/023 |
| 10,267,907 | B2 * | 4/2019 | Shikatani | G01S 13/60 |
| 10,605,889 | B2 * | 3/2020 | Ylamurto | G01S 5/0289 |
| 10,866,302 | B2 * | 12/2020 | Wu | H04W 4/33 |
| 11,298,110 | B2 * | 4/2022 | Mansour | G01F 1/663 |
| 11,668,790 | B2 * | 6/2023 | Wu | G01S 7/2883 342/132 |
| 12,007,468 | B2 * | 6/2024 | Campbell | G01S 7/292 |
| 12,019,141 | B2 * | 6/2024 | Overdevest | G01S 13/584 |
| 12,130,381 | B2 * | 10/2024 | Kästner | G01S 13/42 |
| 12,265,666 | B2 * | 4/2025 | Hayashi | G01S 7/358 |
| 12,282,088 | B2 * | 4/2025 | Hakobyan | G01S 13/9004 |
| 12,320,920 | B2 * | 6/2025 | Wu | G01S 7/356 |
| 12,461,224 | B2 * | 11/2025 | Sanson | G01S 13/931 |
| 2004/0178951 | A1 * | 9/2004 | Ponsford | G01S 7/32 342/194 |
| 2005/0007269 | A1 * | 1/2005 | Carrara | G01S 13/904 342/25 R |
| 2005/0046612 | A1 * | 3/2005 | Blunt | G01S 13/284 342/134 |
| 2005/0057392 | A1 * | 3/2005 | Blunt | G01S 7/2921 342/195 |
| 2010/0259442 | A1 * | 10/2010 | Abatzoglou | G01S 13/282 342/25 A |
| 2013/0009807 | A1 * | 1/2013 | Lamb | G01S 13/904 342/25 B |
| 2014/0035776 | A1 * | 2/2014 | Sochen | G01S 13/582 342/107 |
| 2015/0145718 | A1 * | 5/2015 | Choi | G01S 13/282 342/26 R |
| 2016/0178742 | A1 * | 6/2016 | Shikatani | G01S 13/931 342/113 |
| 2017/0026847 | A1 * | 1/2017 | Farshchian | G01S 7/021 |
| 2017/0318474 | A1 * | 11/2017 | Farshchian | G01S 7/021 |
| 2019/0046161 | A1 * | 2/2019 | Mansour | A61B 8/4494 |
| 2019/0187236 | A1 * | 6/2019 | Ylamurto | G01S 13/878 |
| 2020/0271747 | A1 * | 8/2020 | Wu | G01P 15/18 |
| 2020/0341476 | A1 * | 10/2020 | Wuthishuwong | G08G 1/167 |
| 2021/0018593 | A1 * | 1/2021 | Kästner | G01S 13/931 |
| 2021/0156981 | A1 * | 5/2021 | Stettiner | G01S 13/931 |
| 2021/0156982 | A1 * | 5/2021 | Stettiner | G01S 13/931 |
| 2022/0187438 | A1 * | 6/2022 | Overdevest | G01S 13/532 |
| 2022/0390555 | A1 * | 12/2022 | Wu | G01S 7/411 |
| 2023/0003873 | A1 * | 1/2023 | Hakobyan | G01S 13/9004 |
| 2023/0324509 | A1 * | 10/2023 | Wu | G01S 7/356 342/109 |
| 2024/0012127 | A1 * | 1/2024 | Campbell | G01S 13/582 |
| 2024/0036187 | A1 * | 2/2024 | Sanson | G01S 13/34 |
| 2024/0231505 | A1 * | 7/2024 | Hayashi | G06N 3/0985 |
| 2025/0172698 | A1 * | 5/2025 | Wagner | G01S 7/4815 |

OTHER PUBLICATIONS

He et al., "Emerging Trends in Radar: Robust Sparse Beamforming for Radar Array Processing," IEEE Aerospace and Electronic Systems Magazine (2025), 4 pages.

Extended European Search Report for EP App. No. 22214602.9 dated Mar. 22, 2023, 12 pages.

Dominik Kellner, "Instantaneous Ego-motion Estimation Using Doppler Radar" Oct. 1, 2013, 16th International IEEE Conference on Intelligent Transportation Systems (ITSC 2013), pp. 869-874.

Timo Grebner, Instantaneous Ego-motion Estimation Based on Ambiguous Velocity Information Within a Network of Radar Sensors May 16, 2022, 2022 14th German Microwave Conference (GEMIC), pp. 140-143.

* cited by examiner

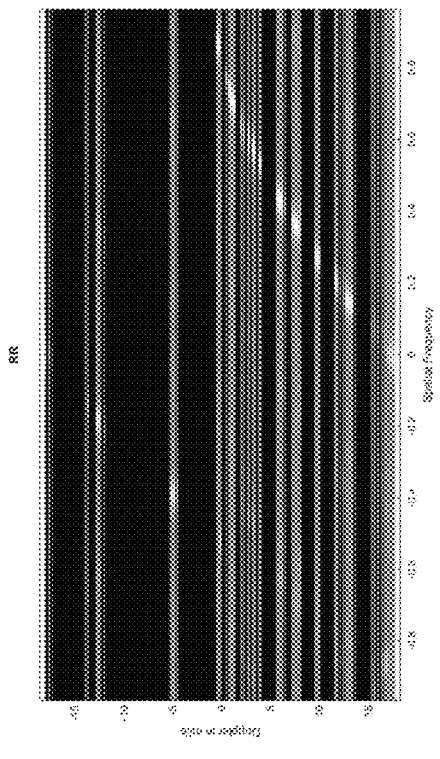
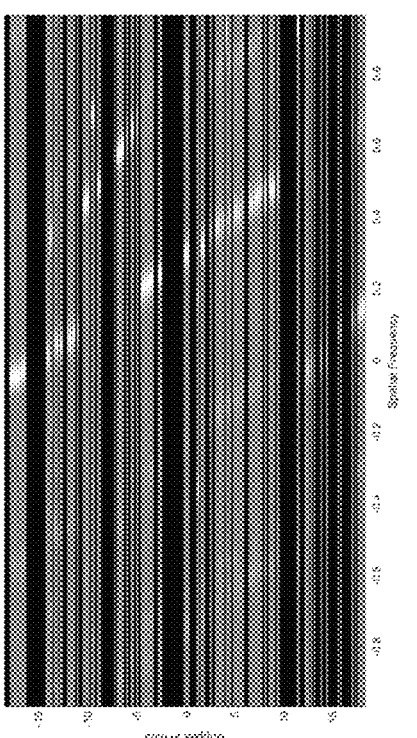
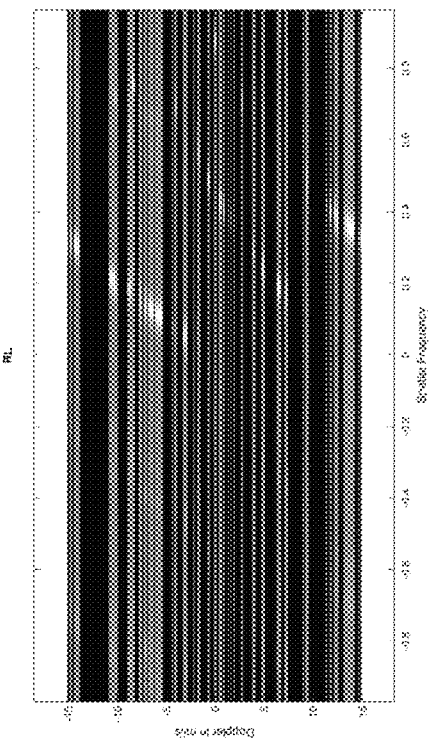
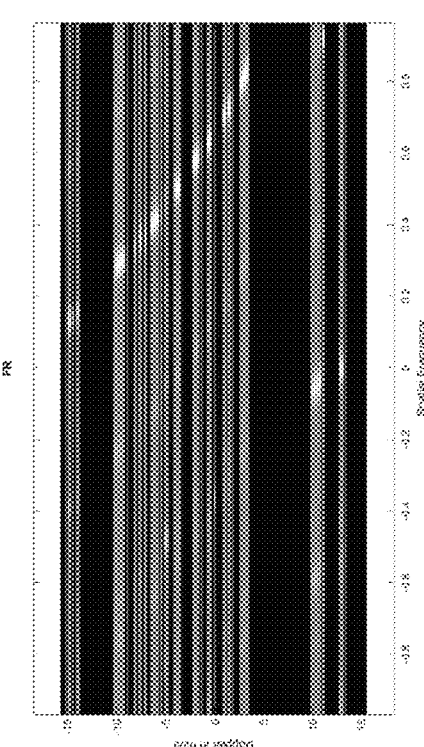
Fig. 3

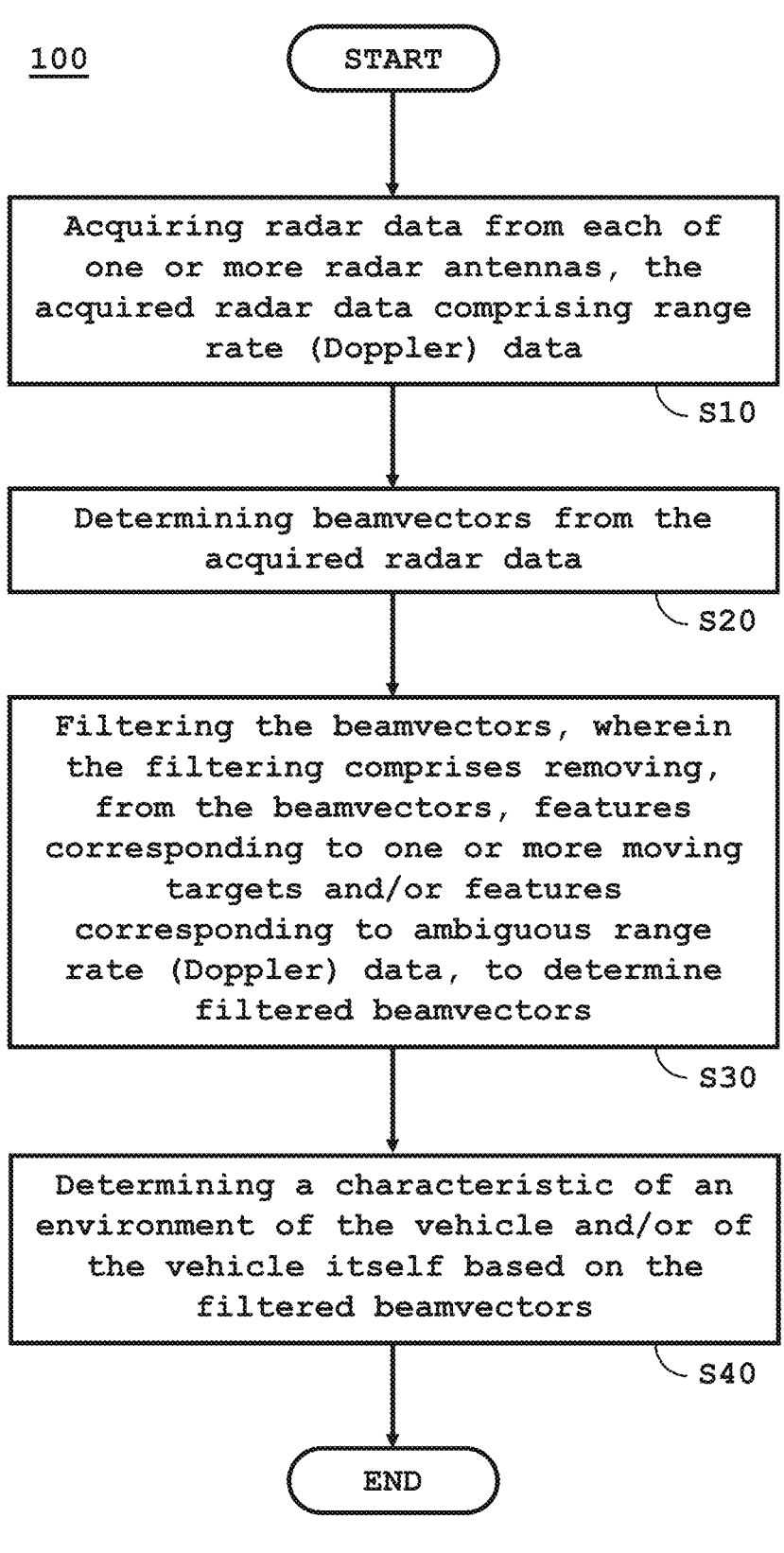

100

START

Acquiring radar data from each of one or more radar antennas, the acquired radar data comprising range rate (Doppler) data

S10

Determining beamvectors from the acquired radar data

S20

Filtering the beamvectors, wherein the filtering comprises removing, from the beamvectors, features corresponding to one or more moving targets and/or features corresponding to ambiguous range rate (Doppler) data, to determine filtered beamvectors

S30

Determining a characteristic of an environment of the vehicle and/or of the vehicle itself based on the filtered beamvectors

S40

END

Fig. 5

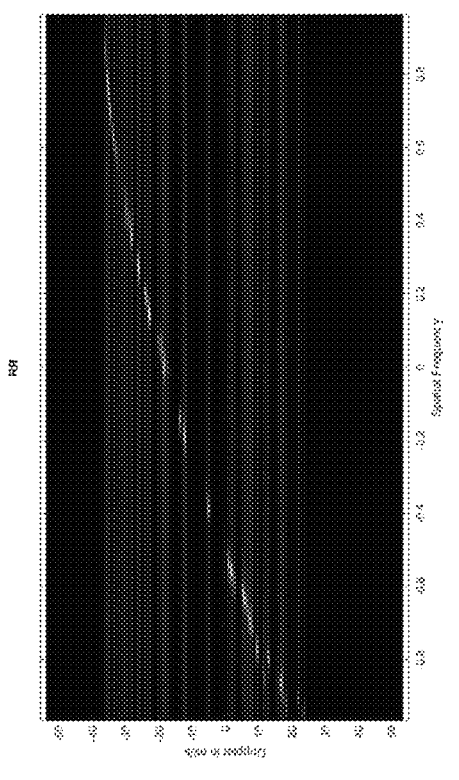
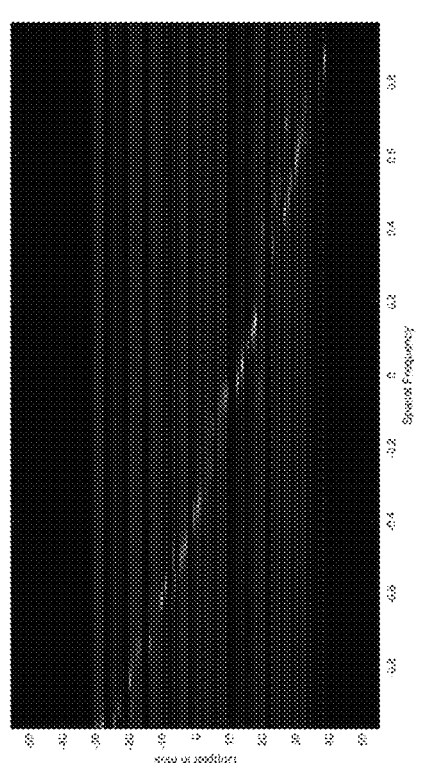
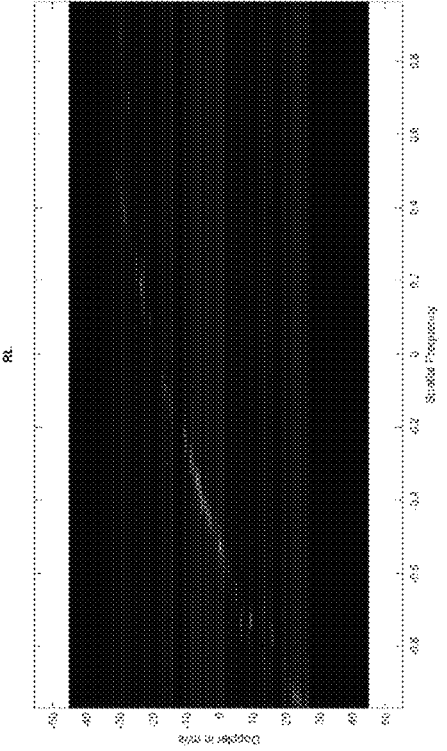
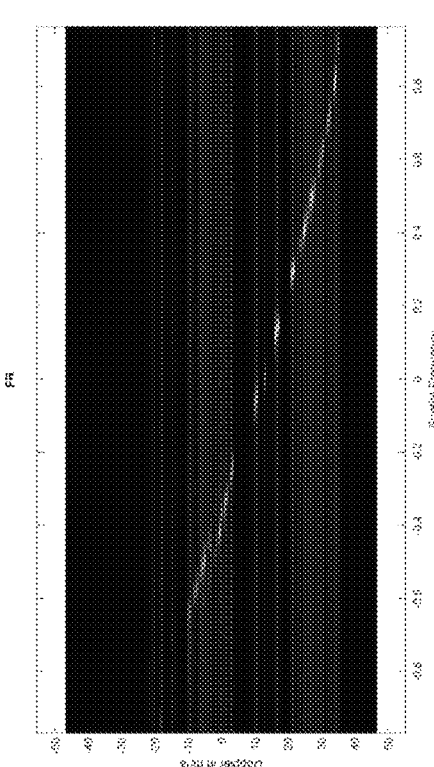
Fig. 6

BEAMVECTOR FILTERING AND DISAMBIGUATION USING VELOCITY PROFILE PATTERN FOR LOW-LEVEL RADAR EGO-MOTION

CROSS-REFERENCE TO RELATED APPLICATIONS

This application claims priority to European Patent Application No. 22 214 602 filed Dec. 19, 2022, the entire disclosure of which is incorporated by reference.

FIELD

The present disclosure relates to methods and systems for processing radar data of a vehicle. In particular, the present disclosure relates to methods and systems for generating filtered and disambiguated radar data.

BACKGROUND

Many perception algorithms employed in the automotive industry require information about the ego-motion (e.g. velocity vector, yaw rate) of a vehicle in order to correctly perceive the vehicle's environment. The requirement for stable and accurate ego-motion estimation algorithms is therefore a vital part of Advance Driving Assistant Systems (ADAS) and autonomous driving applications. The vehicle's ego-motion can, for example, be estimated using measurements acquired by a radar sensor such as pulse-Doppler radar sensor. Pulse-Doppler radar sensors are employed in radar systems that determine the range to a target using pulse-timing techniques and use the Doppler effect of the reflected signal to determine a velocity (range rate) of the target.

EP 4 036 601 A1 discloses a method of processing radar data obtained by a radar sensor mounted on a vehicle to generate a set of motion spectrum data for estimating ego-motion information of the vehicle.

EP 4 036 602 A1 discloses a method of determining ego-motion information of a vehicle comprising a radar sensor having a plurality of antenna elements.

SUMMARY

There is, however, the problem that radar data often suffers from inherent errors and errors occurring due to the use of outlier measurements which may degrade the resulting precision of estimating the vehicle's ego-motion. Firstly, the acquired radar data may comprise measurements for moving targets in the field-of-view (FOV) of the radar sensor, such as other vehicles, pedestrians, or cyclists. Secondly, when reflected radar signals arrive from targets moving fast enough for the Doppler frequency to exceed a pulse repetition frequency (PRF) of the emitted radar signal, the measured range rate (Doppler) data may comprise ambiguities. That is, measured range rate of the target may differ from the actual radial relative velocity of the target with respect to the radar sensor.

This problem may result in degraded results of the calculated ego-motion information using motion spectrum data generated from such radar data. There is, therefore, a need to provide method for generating filtered and disambiguated radar data to be used for ego-motion estimation.

The novel approach provides a method capable of delivering a low-level filtering of radar data. This way, filtered radar data may be provided based on which a characteristic of the environment or the vehicle itself may be determined. For example, the filtered radar data may be used for the estimation of the vehicle's velocity and yaw rate.

One embodiment relates to a method for processing radar data of a vehicle, the method comprising: acquiring radar data from each of one or more radar antennas, the acquired radar data comprising range rate (Doppler) data; determining beamvectors from the acquired radar data; filtering the beamvectors, wherein the filtering comprises removing, from the beamvectors, features corresponding to one or more moving targets and/or features corresponding to ambiguous range rate (Doppler) data, to determine filtered beamvectors; and determining a characteristic of an environment of the vehicle and/or of the vehicle itself based on the filtered beamvectors.

Further various embodiments are described in the dependent claims.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Embodiments of the present disclosure, which are presented for better understanding the inventive concepts, but which are not to be seen as limiting the disclosure, will now be described with reference to the figures.

FIG. 3 illustrates examples of motion spectra, each recorded by a radar sensor mounted on a rear-left (RL), rear-right (RR), front-right (FR) and front-left (FL) corner of a chassis of a vehicle.

FIG. 5 shows a flowchart of a method for processing radar data of a vehicle according to an embodiment of the present disclosure.

FIG. 6 illustrates examples of motion spectra based on the filtered beamvectors according to an embodiment of the present disclosure.

In the drawings, reference numbers may be reused to identify similar and/or identical elements.

DETAILED DESCRIPTION

The present disclosure shall now be described in conjunction with specific embodiments. The specific embodiments serve to provide the skilled person with a better understanding but are not intended to in any way restrict the scope of the disclosure, which is defined by the appended claims. In particular, the embodiments described independently throughout the description can be combined to form further embodiments to the extent that they are not mutually exclusive.

A radar sensor may comprise transmit and receive antennas. A transmit antenna may transmit a radar signal and the transmitted radar signal may be reflected by a target. A receive antenna may receive the reflected radar signal. Alternatively, a radar sensor may comprise transducer antennas capable of switching between transmitting and receiving radar signals. A pulse-Doppler radar sensor, for example, may transmit a radar signal comprising a set of coherent pulses repeated at a steady pulse repetition frequency (PRF).

The one or more radar antennas may, for example, be part of a frequency modulated continuous wave radar (FMCW) radar sensor. A FMCW radar sensor may be used to measure a range (distance to a target) based on time differences between transmitted and reflected radar signals. The FMCW radar sensor may transmit a continuous radar signal with alternating frequencies. For example, The FMCW radar may generate a frequency ramp, commonly referred to as a chirp.

Figure 1A:
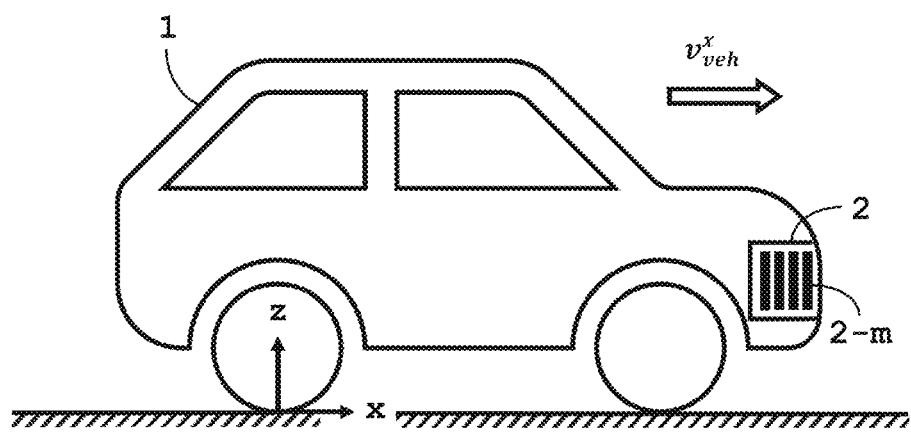
FIG. 1A shows a side view of a vehicle comprising a radar sensor in a front-right corner of a chassis of the vehicle.
Figure 1B:
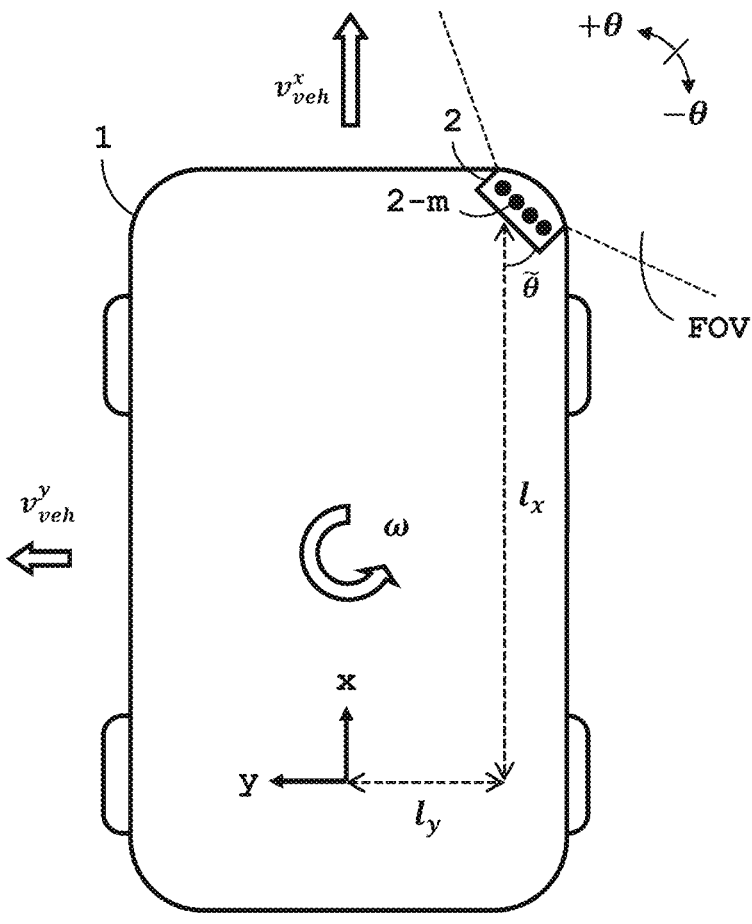
FIG. 1B shows a top view of a vehicle comprising a radar sensor in a front-right corner of a chassis of the vehicle.

FIGS. 1A and 1B show side view and top view, respectively, of a vehicle 1 comprising a radar sensor 2 in a front-right (FR) corner of a chassis of the vehicle. In this example, the radar sensor 2 comprises four radar antennas (antenna elements) 2-m (m=1, . . . , 4) arranged in parallel (to the z-axis) along a first arraying direction (in the x-y-plane). Within the field-of-view (FOV) of the radar sensor 2, reflected radar waves may hit the radar antennas 2-m with different phases.

The reflected radar signal may be received by each of the one or more radar antennas. Each antenna may measure the reflected radar signal using a specified sampling frequency. The resulting measurement data of each antenna may be stored in a measurement matrix having two dimensions. Each time a radar antenna receives a new pulse, a new row may be added to the measurement matrix, and measurements recorded during each pulse repetition interval (PRI) may be stored in the row.

The measurement data includes measurements of a so-called fast-time and measurements of a so-called slow-time. The fast-time measurements typically correspond to small-scale time measurements of the reflected radar signal for each pulse. The number of fast-time measurements per pulse may depend on the specified sampling frequency. In other words, the columns of the measurement matrix record different fast-time measurements. The slow-time measurements typically correspond to the PRI. In other words, the rows of the measurement matrix record different slow-time measurements.

The measurement data for the reflected radar signals received by each of the one or more radar antennas is subject to Doppler processing, wherein fast-time is transformed to range data and slow-time is transformed to range rate (Doppler) data. Doppler processing of the measurement data usually involves using a fast Fourier transform (FFT) as well as noise suppression techniques in order to generate the radar data. Hence, radar data may be represented in the range-Doppler domain. In other words, the radar data acquired from each of the one or more radar antennas refers to the Doppler-processed measurement data of the reflected radar signals.

The radar data may be binned using intervals for each of range data values and Doppler data values. A range bin refers to a bin of range data. For example, the binning may comprise equidistant range bin having a width based on a range resolution of radar sensor. A Doppler bin refers to a bin of Doppler data. The radar data from each of the one or more radar antennas may be aggregated in a three-dimensional representation which is commonly referred to as a radar data cube. The three dimensions of the radar data cube may parameterize the range data, Doppler data, and antenna index. For example, a slice of the radar data cube for a given antenna index may correspond to the Doppler-processed measurement matrix of the antenna corresponding to the given antenna index.

Figure 2:
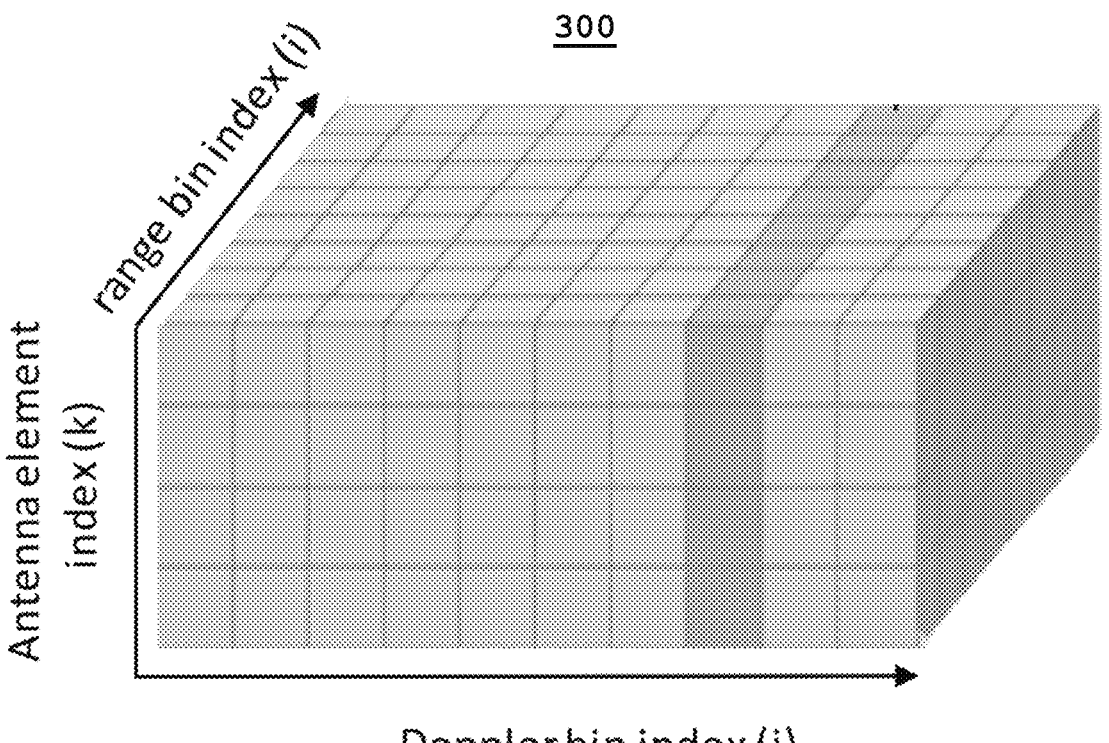
FIG. 2 illustrates a radar data cube representing radar data in the range-Doppler domain.
Figure 4:
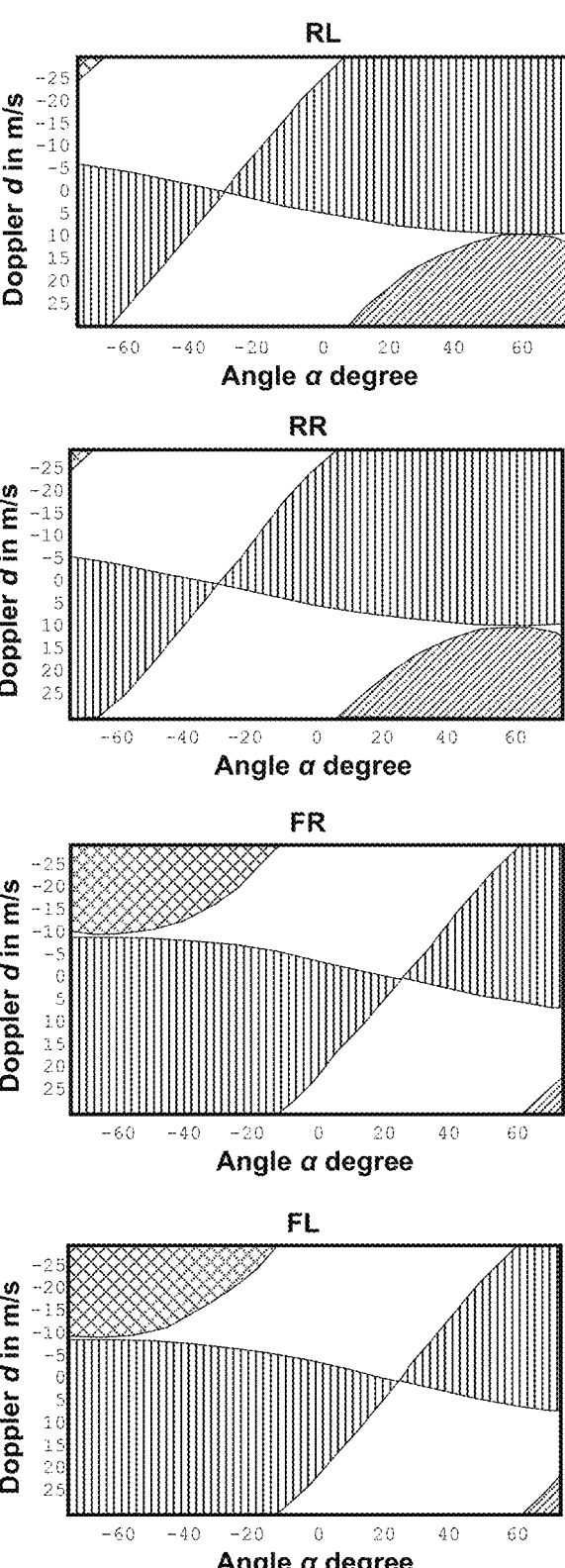
FIG. 4 illustrates examples of regions in motion spectra, each corresponding to a radar sensor mounted on a rear-left (RL), rear-right (RR), front-right (FR) and front-left (FL) corner of a chassis of a vehicle.

FIG. 2 illustrates a radar data cube 400 representing the radar data in the range-Doppler domain, i.e. the radar data acquired after the Doppler processing of the measurement data. As shown in FIG. 4 (left side), the radar data may be binned to form the radar data cube 400 with dimensions (size) I×J×R, wherein each cell may be identified by respective ones of I range bin indices (along a range-dimension of the radar data cube 400), J range rate (Doppler) bin indices (along a Doppler-dimension of the radar data cube 400), and R antenna element indices (along an antenna element dimension of the radar data cube 400). Each range rate (Doppler) bin index is indicative of a radial velocity interval of a potential target relative to the radar sensor. Furthermore, each range bin index is indicative of a distance interval of a potential target from the radar sensor.

A beamvector refers to an array of one or more radar data samples and may be defined for each combination of range data (range bin) and Doppler data (Doppler bin). Each of the one or more radar data samples in a beamvector corresponds to radar data acquired from a corresponding one of the one or more antennas. For example, for a range bin of [10 m, 10.5 m] and a Doppler bin of [5 m/s, 5.5 m/s], the corresponding beamvector comprises the radar data, falling within the bins, that is acquired by each of the one or more antennas. For example, for radar data acquired by four radar antennas, the beamvector may be represented as an array (or vector) of length four, wherein each element of the beamvector corresponds to a radar data sample from one of the four radar antennas for a specific range bin and Doppler bin.

In order to localize a target in an environment using the one or more radar antennas, direction of arrival (DOA) estimation methods may be used to estimate the angle of incidence of the received electromagnetic signal reflected from the target. For example, for a radar sensor comprising a plurality of receive antennas arranged in parallel along a first arraying direction (i.e. an antenna array), the DOA may be measured in a plane spanned by the first arraying direction and an axis perpendicular to the antennas, e.g. the forward direction of the radar sensor (see also FIG. 1B). A polar coordinate system having a midpoint of the radar sensor at the origin may be defined such that the DOA is represented by the azimuth angle, in the following simply referred to as the angle θ. For example, for a radar sensor with a 160° FOV, the angle θ may take values between −80° and +80°.

It should be noted, however, that a radar sensor may comprise another plurality of receive antennas (i.e. another antenna array) having a second arraying direction which is, for example, perpendicular to the first arraying direction. This way, another angle (e.g. the polar angle in a spherical coordinate system of the radar sensor) may be determined.

Together with the range data, the angle θ may be used to calculate the position of the target with respect to the one or more radar antennas. For example, targets may appear as peaks in a range-Doppler map of the radar data and peaks above a certain energy level may be processed using DOA estimation methods such as beam-forming fast Fourier transformation (beam-forming FFT) and/or neural networks to estimate the angle θ of targets. This way, the radar data may be represented in the angle-Doppler domain and a corresponding angle-Doppler map of the radar data may be referred to as a "motion spectrum". Likewise, the angle-Doppler domain may also be referred to as "motion spectrum space".

FIG. 3 illustrates examples of motion spectra, each recorded by a radar sensor mounted on a rear-left (RL), rear-right (RR), front-right (FR) and front-left (FL) corner of a chassis of a vehicle driving at 35 m/s. Here, the range rate (Doppler) is shown in units of m/s on the y-axis and the spatial frequency ψ is shown on the x-axis. The spatial frequency y may be derived based on the angle θ and describes the phase propagation of the received reflected radar waves along the antenna array. The relationship is given through the transformation:

$$\psi = \frac{L_a}{\lambda} \sin(\theta)$$

Here, $L_a$ is the distance between the antennas in the antenna array of the λ is the wavelength of the radar signal.

The grey-scale represents the measured energy or intensity of the reflected radar wave. Dark horizontal bands correspond the absence of radar data at the corresponding Doppler value. The bright bands extending primarily in diagonal directions represent one or more targets in the environment of the respective radar sensor. A target may be any object in the environment of the radar sensor from which a reflected radar signal is received. For example, the target may be a vehicle.

As illustrated by motion spectra, each of the one or more targets may extend in an azimuth direction as seen by the radar sensor. The relative radial velocity of a target may thus vary for different values of the angle or the spatial frequency leading to a sloped bright band in the motion spectrum.

Furthermore, the motion spectra illustrate range rates (Doppler) ranging from −15 m/s to +15 m/s which corresponds to the so-called unambiguous (relative radial) velocity interval and is determined by the pulse width of the transmitted radar signal. That is, a different pulse width leads to a different unambiguous velocity interval size. Targets moving towards or away from a radar sensor with a relative radial velocity exceeding this unambiguous velocity interval may consequently be mis-identified with an incorrect range rate. Specifically, the mis-identification may lead to a "wrap around" of the motion spectrum along the y-axis. The "wrap around" effect can be observed in plots of FIG. 3 where the slope of the bright bands ending at one of the boundaries of the unambiguous velocity interval, e.g. at +15 m/s or at −15 m/s, continues at the opposite boundary, e.g. at −15 m/s or at +15 m/s, respectively.

The problem of mis-identification of a target's range rate due to the limited pulse width of the transmitted radar signal is referred to a Doppler ambiguity. The angle (or spatial frequency) is unaffected by limited pulse width. The size of the unambiguous velocity interval is denoted by d_vua. In the present example, unambiguous velocity interval is [−15 m/s, +15 m/s] and has a size d_ua of 30 m/s.

The Doppler ambiguity may further be distinguished between a positive Doppler ambiguity and a negative Doppler ambiguity. In line with the present example, a target having a relative radial velocity of 20 m/s at a given angle, i.e. exceeding the upper boundary at +15 m/s, may be mis-identified with a range rate of −10 m/s. This is referred to as a positive Doppler ambiguity. Likewise, a target having a relative radial velocity of −30 m/s at a given angle, i.e. exceeding the lower boundary at −15 m/s, may be mis-identified with a range rate of 0 m/s. This is referred to as a negative Doppler ambiguity. The actual relative radial velocity of a target may also be referred to as the true range rate.

An estimation of the ego-motion of the one or more radar antennas (or of the vehicle to which the radar antennas are mounted) or a refinement of an existing estimate thereof requires determining the range rate of at least one stationary target in the environment as a reference. For example, if the one or more radar antennas are mounted on a vehicle, the ego-motion cannot be estimated based on a range rate measured for a moving target such as another vehicle moving in the environment. In the present example, a stationary target may be a house wall, a streetlamp, a tree, a guardrail, a parked car, or the like.

In order to distinguish moving targets and stationary targets and resolve the Doppler ambiguities in the radar data, the inventors have studied the dynamics of targets as observed in the motion spectrum and devised an approach for defining regions in the motion spectrum that can be attributed to either moving or stationary targets and regions that can be attributed to Doppler ambiguities of stationary targets.

The regions in motion space defined by this approach may be used to filter the beamvectors of the radar data acquired by the one or more radar antennas. In the following, an approach of defining the regions is described for an example in which the one or more radar antennas are mounted at one or more corners of a chassis of a vehicle, as illustrated in FIGS. 1A and 1B.

Here, the x-axis and y-axis may define a Cartesian coordinate system, usually referred to as the vehicle coordinate system (VCS), wherein the origin may be located at the center of the vehicle's rear axle, the x-axis may point along the forward direction and the y-axis may point to the left side of the vehicle. In a three-dimension version of the VCS, the origin may be located on the ground, below the midpoint of the rear axle, and the z-axis may point up from the ground so as to maintain the right-handed coordinate system. FIGS. 1A and 1B show the VCS for a side view and top view of a vehicle, respectively.

For a given ego-motion of the vehicle, the range rate expected for a stationary target located at the angle θ is given by the velocity profile equation $$-\dot{r} = \cos(\theta + \tilde{\theta})v_x^S + \sin(\theta + \tilde{\theta})v_y^S$$

Here, $$v_x^S = -\omega \cdot l_y + v_{veh}^x \text{ and } v_y^S = \omega \cdot l_x + v_{veh}^y$$

are the longitudinal and lateral velocities of the one or more radar antennas, respectively, $$l_x$$

and $$l_y$$

are the longitudinal and lateral mounting positions and $\tilde{\theta}$ is the (azimuth) mounting angle of the one or more radar antennas on the vehicle, as shown in the example of FIG. 1B. The ego-motion of the vehicle is given by the longitudinal and lateral velocities of the vehicle denoted as $$v_{veh}^x$$

and $$v_{veh}^y,$$

respectively, and by the yaw rate $\omega$.

If a maximal possible ego-motion, i.e. maximal possible values for the velocities $$v_{veh}^x$$

and $$v_{veh}^y$$

and the yaw rate $\omega$, can be assumed, consequently a maximal range rate of stationary targets can be calculated in dependence on the angle $\theta$. Any measured range rate greater than this maximal range rate must therefore correspond to a moving target. Likewise, if a minimal possible ego-motion, i.e. minimal possible values for the velocities $$v_{veh}^x$$

and $$v_{veh}^y$$

and the yaw rate w, can be assumed, consequently a minimal range rate of a stationary target can be calculated in dependence of the angle $\theta$. Any measured range rate less than this minimal range rate must therefore correspond to a moving target.

In other words, the region in motion space of stationary targets lies, for each angle $\theta$, inside a range rate interval determined by the velocity profile equation for the assumed possible velocity and yaw rate values of the vehicle. The assumed possible velocities and yaw rate values for the vehicle can be given a priori (e.g. according to the vehicle's specifications) to calculate a global region in motion space, or it can be further restricted by using an independent motion sensor, previous estimate, or other prior information about the scenario.

An independent motion sensor may provide an auxiliary measurement of the ego-motion of the vehicle and may, for example, be an on-board odometry sensor, a GPS-based speedometer, or the like. The independent motion sensor may provide an auxiliary measurement of the ego-motion at a lower precision than the ego-motion calculated using the radar data. However, it may provide a rough estimate for the ego-motion that can be used to further restrict the regions in motion space.

The region of stationary target may be extended to consider the disambiguation of range rate (Doppler) values that have been mis-identified due to the positive or negative Doppler ambiguities. As explained above, the region of stationary targets may "wrap around" the boundary of the unambiguous velocity interval and can be extended to also cover regions in motion space corresponding to these Doppler ambiguities. For range rates measured in these ambiguous regions of motion space, a true range rate $\dot{r}_{true}$ may be computed by adding (or subtracting) an integer multiple k>0 of the unambiguous velocity interval size $d_{vua}$ to the measured range rate $\dot{r}_{measured}$:

$$\dot{r}_{true} = \dot{r}_{measured} \pm k \cdot d_{vua}$$

FIG. 4 illustrates examples of regions in motion spectra, each corresponding to a radar sensor mounted on a rear-left (RL), rear-right (RR), front-right (FR) and front-left (FL) corner of a chassis of a vehicle. Here, the range rate (Doppler) is shown in units of m/s on the y-axis and the angle $\theta$ is shown in degrees on the x-axis. Regions show with a hatched area in each of the plots correspond to radar data that may correspond to stationary targets and these regions are also referred to as validity regions.

Shown as a vertically hatched area (bottom left to top right in each plot) is a first validity region corresponding to expected motion spectra of stationary targets within the FOV of the one or more radar antennas. Shown as a cross-hatched area (top left in each plot) is a second validity region corresponding to positive Doppler ambiguities resulting from stationary targets within the FOV of the one or more radar antennas having a velocity that exceeds the unambiguous velocity interval of the one or more radar antennas. Shown as a diagonally hatched area (bottom right in each plot) is a third validity region corresponding to negative Doppler ambiguities resulting from stationary targets within the FOV of the one or more radar antennas having a velocity that falls below the unambiguous velocity interval of the one or more radar antennas. Shown as an unfilled area is a region corresponding to expected motion spectra of moving targets within the FOV of the one or more radar antennas.

It should be noted that cross-hatched and hatched areas in each plot represent the positive and negative Doppler ambiguity, respectively, where k=1 (see Equation 3). Higher values of k correspond to multiple "wrap arounds" in the motion spectrum and the corresponding regions are not shown in FIG. 4. In other words, the second and third validity regions include Doppler ambiguities for k>1 but they are not shown in the present example for the sake of a more concise illustration.

It should be noted that any one of the first, second and third validity regions may still comprise radar data corresponding to moving targets and/or other sources of noise. The acceptance of moving targets by any one of the first, second and third validity regions may be reduced by decreasing the unambiguous velocity interval size $d_{vua}$ using more precise prior information.

The first, second and third validity region may partially or fully overlap with one another. In the following an example for the calculation of the first, second and third validity regions is described.

The calculation may be performed for N discrete (azimuth) angles $\theta_1, \ldots, \theta_N$ of the FOV of the radar sensor, wherein N is a positive integer. In other words, the FOV of the radar sensor may be discretized into N intervals (bins) of the angle $\theta$ and the calculation may be performed for each of the discrete (azimuth) angles $\theta_1, \ldots, \theta_N$ as described below. The discrete angles $\theta_1, \ldots, \theta_N$ may represent a predetermined binning of the FOV of the radar sensor.

First, for each of the eight ($2^3$) combinations of minimum/maximum possible longitudinal and lateral velocities of the vehicle, $$v_x^{min}/v_x^{max}$$

and $$v_y^{min}/v_y^{max},$$

respectively, and minimum/maximum yaw rate, $$\omega^{min}/\omega^{max},$$

of the vehicle, the respective Doppler value is calculated as a function of the discrete angles $\theta_1, \ldots, \theta_N$ based on Equation 2.

The calculation of the Doppler values may include performing a coordinate transformation based on the longitudinal and lateral mounting positions, $$l_x$$

and $$l_y,$$

respectively, and the mounting angle $\tilde{\theta}$ of the one or more radar antennas on the vehicle. By performing the coordinate transformation the minimum/maximum longitudinal and lateral velocities of the vehicle, $$v_x^{min}/v_x^{max}$$

and $$v_y^{min}/v_y^{max}$$

respectively, and minimum/maximum yaw rate, $$\omega^{min}/\omega^{max}$$

(i.e. represented in the VCS) are transformed into the coordinate system of the one or more radar antennas.

Next, the extremal Doppler values are determined for each of the discrete angles $\theta_1, \ldots, \theta_N$. In other words, for each of the discrete angles $\theta_1, \ldots, \theta_N$, a minimum Doppler value $$D_{min}^\alpha$$

and a maximum Doppler value $$D_{max}^\alpha$$

may be determined from the eight Doppler values representing the combinations of minimum/maximum possible longitudinal and lateral velocities of the vehicle, $$v_x^{min}/v_x^{max}$$

and $$v_y^{min}/v_y^{max}$$

respectively, and minimum/maximum yaw rate, $$\omega^{min}/\omega^{max}$$

of the vehicle. Here, the (azimuth) angle $\alpha$ denotes any one of the discrete angles $\theta_1, \ldots, \theta_N$.

Doppler values less than the minimum Doppler value $$D_{min}^\alpha$$

and Doppler values greater that the maximum Doppler value $$D_{max}^\alpha$$

correspond to targets which are not stationary. In other words, for the given values of minimum/maximum possible longitudinal and lateral velocities of the vehicle, $$v_x^{min}/v_x^{max}$$

and $$v_y^{min}/v_y^{max}$$

respectively, and minimum/maximum yaw rate, $$\omega^{min}/\omega^{max}$$

of the vehicle, the interval between $$D^\alpha_{min}$$

and $$D^\alpha_{max}$$

defines a range of possible Doppler values that may be measured for stationary targets at a given angle $\alpha$. As a function of the angle $\alpha$, $$D^\alpha_{min}$$

and $$D^\alpha_{max}$$

define an area (region) containing possible motion spectra of stationary targets. This area in motion space may represent the first validity region.

Furthermore, in order to account for the Doppler ambiguities, determination of extremal Doppler values may further include determining additional extremal Doppler values based on Equation 3. In other words, for a given angle $\alpha$, the minimum/maximum Doppler value $$D^\alpha_{min}/D^\alpha_{max}$$

may lie outside the unambiguous velocity interval such that an additional minimum/maximum Doppler value may be determined which lies within the unambiguous velocity interval by adding/subtracting $$k \cdot d_{vua}$$

to $$D^\alpha_{min}/D^\alpha_{max}.$$

As a function of the angle $\alpha$, the additional minimum/ maximum Doppler values define areas (regions) containing possible motion spectra of stationary targets having ambiguous Doppler values. These areas in motion space may represent the second and third validity regions.

The first, second and third validity regions may then be defined as binary pattern $P_{stat}(d, \alpha)$, $P_{pos}(d, \alpha)$ and $P_{neg}(d, \alpha)$, respectively, in order to identify stationary targets, positive Doppler ambiguities and negative Doppler ambiguities, respectively. Here, the parameter d refers to the discretized range rate (Doppler).

The binary pattern $P_{stat}(d, \alpha)$ defining the first validity region representing stationary targets, may be given as $$P_{stat}(d, \alpha) = \begin{cases} 1, & \text{if } d < D^\alpha_{max} \text{ and } d > D^\alpha_{min} \\ 0, & \text{else} \end{cases}$$

The binary pattern $P_{neg}(d, \alpha)$ defining the second validity region representing positive Doppler ambiguities, may be given as $$P_{pos}(d, \alpha) = \begin{cases} 1, & \text{if } d + k \cdot d_{vua} < D^\alpha_{max} \text{ and } d + k \cdot d_{vua} > D^\alpha_{min} \\ 0, & \text{else} \end{cases}$$

The binary pattern $P_{neg}(d, \alpha)$ defining the third validity region representing negative Doppler ambiguities, may be given as $$P_{neg}(d, \alpha) = \begin{cases} 1, & \text{if } d - k \cdot d_{vua} < D^\alpha_{max} \text{ and } d - k \cdot d_{vua} > D^\alpha_{min} \\ 0, & \text{else} \end{cases}$$

Note that for the binary patterns $P_{pos}(d, \alpha)$ and $P_{neg}(d, \alpha)$, the positive integer k may in principle take any value. However, larger values of k correspond to multiple "wrap arounds" in motion spectrum which become increasingly unlikely since potential targets in an environment typically do not exceed certain speeds. For example, in an urban environment with road traffic, the typical speed of a vehicle lies between 0 km/h and 50 km/h. The range rates expected to be measured in such an environment limit the maximum number of possible "wrap arounds" in motion spectrum. Thus, for practical reason, k may be limited to values between 0 and K in the computation of the binary patterns $P_{pos}(d, \alpha)$ and $P_{neg}(d, \alpha)$, wherein the threshold K may be determined based on the typical speed of potential targets in the given environment.

For each value of the angle $\alpha=\theta_1, \ldots, \theta_N$, the binary patterns $P_{stat}(d, \alpha)$, $P_{pos}(d, \alpha)$ and $P_{neg}(d, \alpha)$ of the first, second and third validity region, respectively, can be implemented as a bandpass filter for the angles $\theta$ (or spatial frequencies $\psi$) and the range rates d of the motion spectrum in the angle-Doppler domain.

Using the above binary patterns as a window to filter a motion spectrum may, however, require the highly complex and computationally intensive process of having to first perform a detection in the range-Doppler domain to identify cells in the range-Doppler map with high energy levels, and to then additionally perform a DOA estimation method on the beamvectors corresponding to the identified cells in order to obtain angular information in the angle-Doppler domain. This may lead to a delay in the filtering of the radar data.

In order to solve this problem, the present disclosure teaches an approach for filtering the beamvectors of the acquired radar data without first having to perform processing steps for transforming the radar data from the range-Doppler domain into the angle-Doppler domain. In order to enable for estimating characteristics of the environment or the vehicle, such as the ego-motion of the vehicle, beamvectors belonging to the same Doppler bin are added up to a covariance matrix before calculating the motion spectrum.

The filtering is therefore already done on the each of the beamvectors i.e., before summing up the beamvectors to the covariance matrix. The approach is based on an application of the convolution theorem and has the technical advantage that a computationally efficient and fast low-level filtering of radar data may be provided.

More specifically, a beamvector b may be transformed into the angle-Doppler domain using a transformation matrix A with dimensions M×N and defined as $$A =$$

$$\left[ \begin{array}{cccc} 1 & 1 & \cdots & 1 \\ \exp\left(i \cdot \frac{2\pi}{\lambda}\sin(\theta_1)y_2\right) & \exp\left(i \cdot \frac{2\pi}{\lambda}\sin(\theta_2)y_2\right) & \cdots & \exp\left(i \cdot \frac{2\pi}{\lambda}\sin(\theta_N)y_2\right) \\ \exp\left(i \cdot \frac{2\pi}{\lambda}\sin(\theta_1)y_3\right) & \exp\left(i \cdot \frac{2\pi}{\lambda}\sin(\theta_2)y_3\right) & \cdots & \exp\left(i \cdot \frac{2\pi}{\lambda}\sin(\theta_N)y_3\right) \\ \vdots & \vdots & \ddots & \vdots \\ \exp\left(i \cdot \frac{2\pi}{\lambda}\sin(\theta_1)y_M\right) & \exp\left(i \cdot \frac{2\pi}{\lambda}\sin(\theta_2)y_M\right) & \cdots & \exp\left(i \cdot \frac{2\pi}{\lambda}\sin(\theta_N)y_M\right) \end{array} \right]^j$$

The superscript H of the transformation matrix A denotes a Hermitian conjugation. Again, $\theta_1, \ldots, \theta_N$ denote the N discrete angles representing the binning of the FOV. The geometrical position of a radar antenna j of the one or more radar antennas along the y-axis, i.e. the horizontal axis on the antenna array plane, is denoted by y; and M denotes the number of radar antennas (M≥1). Again, $\lambda$ denotes the wavelength of the radar signal. The sine is used for projecting the discrete angles $\theta_1, \ldots, \theta_N$ onto the antenna array plane.

In other words, the sine is used to map the discrete angles $\theta_1, \ldots, \theta_N$ to spatial frequencies $$\psi_1^{(j)}$$

$$, \ldots ,$$

$$\psi_N^{(j)}$$

observed on the antenna array plane (c.f. Equation 1), wherein j=1, . . . , M. Ideally, the spacing of the radar antennas along the arraying direction is equidistant. In practice, due to a sparseness of the antenna array, one subset of the antennas may be arranged with equidistant spacing, i.e. at a nominal distance away from a neighboring antenna, while another subset of antennas may be arranged at an integer multiple of the nominal distance away from a neighboring antenna. In the processing of the radar data, these gaps in the antenna array may be interpreted as "missing elements" producing a zero measurement. Hence, by including zero measurements from these "missing elements", equidistance of the spacing of the radar antennas may assumed in the calculations. The binning of the spatial frequencies $$\psi_1^{(j)}$$

$$, \ldots ,$$

$$\psi_N^{(j)}$$

is equidistant, i.e.

$$\psi_{i+1}^{(j)} - \psi_i^{(j)} = \psi_{i+2}^{(j)} - \psi_{i+1}^{(j)} \text{ for all } i = 1, \ldots, N-2 \text{ and } j = 1, \ldots, M.$$

The transformation matrix A of Equation 7 thus performs a discrete Fourier transform (DFT), wherein A·b converts the beamvector b, i.e. a finite array of (equidistant) radar data samples into the range-Doppler domain, wherein each of the radar data samples corresponds to the radar data acquired from a corresponding one of the (equally-spaced) radar antennas, into an array of M (equidistant) radar data samples in the angle-Doppler domain.

In the transformation matrix A, the first row is normalized to 1. Each of the exponential functions may include a prefactor $e_0$ representing an arbitrary amplitude of the electromagnetic (radar) wave. As only the phase is important in the subsequent calculations, $e_0$ may be set to 1. In practice, due to the sparseness of antenna arrays and/or the radar data, the product $A \cdot A^H$ may result in a matrix which is close to a diagonal matrix with small nonzero off-diagonal elements.

A given filter window W may be point-wise multiplicated with the transformation A·b of the beamvector b into the angle-Doppler domain. The filter window W may be based on any one of the binary patterns $P_{stat}(d, \alpha)$, $P_{pos}(d, \alpha)$ and $P_{neg}(d, \alpha)$ of the first, second and third validity region, respectively. The filter window W may, for example, be a rectangular, Hann, or Chebyshev windowing function. The filter window W thus acts as a mask on the motion spectrum in the angle-Doppler domain.

In order to enable a computationally efficient and fast low-level filtering of radar data, the beamvector are filtered before calculating the motion spectrum. For example, only features of the beamvectors for which the calculated motion spectrum lies in one of the first, second or third validity region may be selected and other features of the beamvectors are filtered out. Here, features of a beamvector refer to features of the radar wave (radar signal) in the acquired radar data.

The filtering of beamvectors comprises removing, from the beamvectors, features that correspond to one or more moving targets and features that correspond to ambiguous range rate (Doppler) data. The masking of the motion spectrum in the angle-Doppler domain may be performed by a point-wise multiplication ($\odot$) of the filter window W with A·b, which can be expressed, using the convolution theorem, as $$W \odot (A \cdot b) = \left(A \cdot A^H \cdot W\right) \odot (A \cdot b) = A \cdot \left[\left(A^H \ W\right) * b\right]$$

Here, the expression in square brackets on the right-hand side of Equation 8 corresponds the filtered beamvector b', that is $$b' = \left(A^H \cdot W\right) * b$$

Here, the filtered beamvector b' may be defined as a convolution (*) of $A^H \cdot W$ with the beamvector b representing radar data samples in the range-Doppler domain, wherein $A^H \cdot W$ may be interpreted as a back-transformation of the filter window W into range-Doppler domain using the Hermitian conjugate $A^H$ of the transformation matrix A. The filtering thus does not correspond to removing entries from an array of data (e.g. the transformed beamvector A·b) via a point-wise multiplication with a filtering window W, but to a multiplication of an array of radar data (e.g. the beamvector b) with $A^H \cdot W$, whereby features of the beamvector b are removed and a filtered beamvector b' is acquired.

The estimation of the ego-motion of the vehicle can now be performed using the filtered beamvectors, wherein filtered beamvectors belonging to the same Doppler bin are added up to a covariance matrix. The filtering can thus be performed without calculating the motion spectrum in the angle-Doppler domain beforehand.

FIG. 5 shows a flowchart of a method 100 for processing radar data of a vehicle according to an embodiment of the present disclosure.

In step S10, radar data is acquired from each of one or more radar antennas, the acquired radar data comprising range rate (i.e. Doppler) data. In other words, the acquired radar data includes range rate (Doppler) information of targets in an environment of the one or more radar antennas. The one or more radar antennas may be mounted on the vehicle. An environment traversed by the vehicle may comprise moving target and stationary targets.

A vehicle may be a car, bus or motorcycle. A moving target may be another vehicle, cyclist or pedestrian traversing the environment. A stationary target may be locally fixed object in the environment, such as a wall, a lamp post, a tree, and the like.

The step S10 of acquiring radar data from each of the one or more radar antennas may comprise processing of time-domain data using Doppler processing. Measurement data for the reflected radar signals received by each of the one or more radar antennas may be referred to as time-domain data. The Doppler processing may include transforming fast-time data to range data and slow-time data to range rate (Doppler) data.

The radar data may further comprise range data. In other words, the acquired radar data may further comprise range information of targets in the environment of the one or more radar antennas. The acquired radar data may be binned using intervals for each of range data values and Doppler data values and may be represented as a radar data cube.

The one or more radar antennas may be part of a radar sensor, wherein the one or more radar antennas are arranged in parallel along an arraying direction. The radar sensor may be mounted on the vehicle. The vehicle may comprise one or more radar sensors mounted on one or more corners of a chassis of the vehicle. For example, the vehicle may comprise four radar sensors mounted on a rear-left (RL), rear-right (RR), front-right (FR) and front-left (FL) corner of the chassis.

In step S20, beamvectors are determined from the acquired radar data. In general, a beamvector contains information indicative of a phase (and amplitude) of an electromagnetic wave received by different spatially distributed antennas. In particular, a beamvector contains information indicative of phase differences of a signal obtained by different spatially distributed antennas.

For radar data acquired by the one or more radar antennas, a beamvector may comprise radar data samples, wherein each of the radar data samples is associated with a corresponding one of the radar antennas. For radar data represented in the range-Doppler domain, each radar data sample of a beamvector may correspond to an interval (e.g. a bin i) of range and an interval (e.g. a bin j) of range rate (Doppler). In the example of radar data represented in the range-Doppler domain shown in FIG. 2, in total I·J (=8·10=80 here) beamvector may be determined, each beamvector having a length of K (=4 here).

In step S30, the beamvectors are filtered, wherein the filtering comprises removing, from the beamvectors, features corresponding to one or more moving targets and/or features corresponding to ambiguous range rate (Doppler) data, to determine filtered beamvectors. In other words, features from the beamvectors are removed which correspond to motion spectra of moving targets or that are affected by Doppler ambiguities.

Generally, the term feature refers to a piece of data which differs from one or more other pieces of the data. For example, a feature may correspond to a measurement with respect to one or more parameters, wherein the measurements represent a signal above a noise floor, and which differs from the measurements of neighboring values of the one or more parameters. For example, for data represented as a graph with respect to a certain parameter, a sharp peak or dip in the graph may be referred to as a feature. In example discussed with reference to FIG. 3 showing a plot of the radar data with respect to the parameters Doppler and spatial frequency, the various bright bands (i.e. signal above a noise floor) may be referred to as features in the radar data.

In step S40, a characteristic of an environment of the vehicle and/or of the vehicle itself is determined based on the filtered beamvectors. A characteristic of an environment of the vehicle and/or of the vehicle itself is information on one or more properties of the environment and/or the vehicle itself. For example, a property may indicate a position, a velocity, an orientation, and the like. The characteristic may be information on at least one of: stationary targets, moving targets, and an ego-motion of the vehicle. Information on the ego-motion of the vehicle may comprise the longitudinal and lateral velocities of the vehicle, $$v^x_{veh}$$

and $$v^y_{veh}$$

respectively, and the yaw rate $\omega$ of the vehicle.

The filtering of the beamvectors may be based on one or more filter windows representing one or more validity regions in motion spectrum space. Motion spectra outside the one or more validity regions may be filtered from the beamvectors. The filter windows W may be based on binary patterns in motion spectrum space such as the binary patterns $P_{stat}(d, \alpha)$, $P_{pos}(d, \alpha)$ and $P_{neg}(d, \alpha)$ described above.

The filtering of the beamvectors may be based on convolutions using the beamvectors, the one or more filter windows and a transformation matrix. For example, the beamvectors may be filtered as described with reference to Equations 8 and 9.

The one or more validity regions may comprise one or more of a first validity region corresponding to motion spectra of stationary targets within a field-of-view of the one or more radar antennas, a second validity region corresponding to positive Doppler ambiguities resulting from stationary targets within the field-of-view of the one or more radar antennas having a velocity that exceeds an unambiguous velocity interval of the one or more radar antennas, and a third validity region corresponding to negative Doppler ambiguities resulting from stationary targets within the field-of-view of the one or more radar antennas having a velocity that falls below the unambiguous velocity interval of the one or more radar antennas. The size of the unambiguous velocity interval may be specified by a resolution of the one or more radar antennas.

For example, the filtering of the beamvectors may be based on a single filter window representing any one of the first, second and third validity region. For another example, the filtering of the beamvectors may be based on two filter windows representing any two of the first, second and third validity region. For yet another example, the filtering of the beamvectors may be based on three filter windows representing the first, second and third validity region.

The filtering of the beamvectors may further comprise reassigning, from a first beamvector to a second beamvector, the features corresponding to ambiguous range rate (Doppler) data. In other words, range rate (Doppler) data of the first beamvector which has been filtered by a filter window corresponding to one of the second or third validity region (i.e. corresponding to positive or negative Doppler ambiguities) is removed from the first beamvector and added to the second beamvector, wherein the second beamvector is associated with a value (or interval of values) of the range rate (Doppler) information that includes the reassign range rate (Doppler) data. The reassigning may be performed such that an ordering of radar data samples in the second beamvector is maintained.

The filtering of the beamvectors may be based on minimal and maximal values for each of a lateral velocity, a longitudinal velocity and a yaw rate of the vehicle. For example, an assumption may be made for the expected range rates of stationary targets based on the vehicle's current speed. The assumed possible velocities and yaw rate values for stationary targets can be given a priori (e.g. according to the vehicle's specifications) to calculate validity regions in motion space based thereon, or it can be further restricted by using an independent motion sensor, previous estimate, or other prior information about the vehicle (e.g. current gear is P/R/N/D) or the environment (e.g. speed limit).

The method 100 may further comprise estimating an ego-motion of the vehicle based on the filtered beamvectors. The ego-motion of the vehicle may be restricted based on the assumed possible velocity and yaw rate values of the vehicle. The ego-motion of the vehicle may be restricted by using an independent motion sensor, a previous estimate based on filtered beamvectors corresponding to radar data acquired at a previous time, or other prior information about the vehicle or the environment.

FIG. 6 illustrates examples of motion spectra based on the filtered beamvectors according to an embodiment of the present disclosure. The motion spectra illustrate measured intensities of reflected radar signals with respect to range rate (Doppler) and spatial frequency. Each of the motion spectra correspond to a radar sensor mounted on a rear-left (RL), rear-right (RR), front-right (FR) and front-left (FL) corner of the chassis of the vehicle. The motion spectra are based on the same underlying radar data as the motion spectra shown in FIG. 3 so that the effect of the beamvector filtering, which has not been performed for the motion spectra of FIG. 3, may be observed. The filtered beamvectors result in a more distinct signature of stationary targets in the motion spectrum as shown by the bright bands. Furthermore, the Doppler ambiguities are resolved, and the motion spectra are extended beyond the unambiguous velocity interval of −15 m/s to +15 m/s. Therefrom, the ego-motion of the vehicle may be calculated also for more difficult higher velocity scenarios.

Thus, method 100 enables a computationally efficient filtering of stationary targets and disambiguation of radar data in the range-Doppler domain, i.e. in domains before performing the detection of peaks and without having to explicitly calculate the DOA of the detections.

Figure 7:
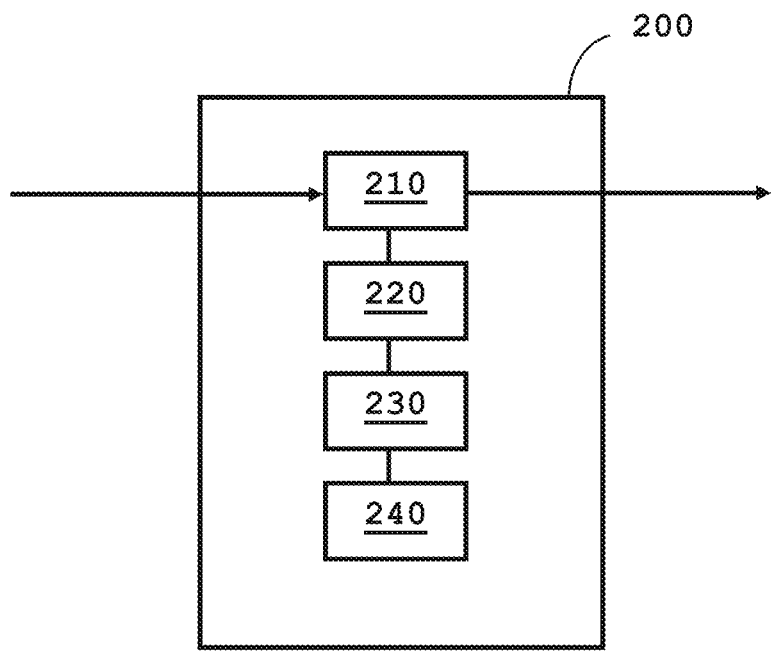
FIG. 7 shows a schematic illustration of a hardware structure of a data processing apparatus according to an embodiment of the present disclosure.

FIG. 7 is a schematic illustration of a hardware structure of a data processing apparatus comprising means for carrying out the steps of the methods of any of the embodiments disclosed above.

The data processing apparatus 200 has an interface module 210 configured to transmit and receive information. The data processing apparatus 200 has also a processor 220 (e.g. a CPU) configured to control the data processing apparatus 200 and to, for instance, execute the steps of the methods of any of the embodiments disclosed above. It may also have a working memory 230 (e.g. a random-access memory) and an instruction storage 240 storing a computer program having computer-readable instructions which, when executed by the processor 220, cause the processor 220 to perform the methods of any of the embodiments disclosed above.

The instruction storage 240 may include a ROM (e.g. in the form of an electrically erasable programmable read-only memory (EEPROM) or flash memory) which is pre-loaded with the computer-readable instructions. Alternatively, the instruction storage 240 may include a RAM or similar type of memory, and the computer-readable instructions can be input thereto from a computer program product, such as a computer-readable storage medium such as a CD-ROM, etc.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s) that various changes in form and detail can be made therein. Thus, the above described example embodiments are not limiting.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method for controlling an advanced driver-assistance system (ADAS) of a vehicle, the method comprising:
    acquiring radar data from each of one or more radar antennas, wherein:
        the acquired radar data includes range rate (Doppler) data, and
        the one or more radar antennas are mounted on the vehicle;
    determining beamvectors from the acquired radar data;
    filtering the beamvectors, wherein:
        the filtering includes determining filtered beamvectors by removing, from the beamvectors, at least one of features corresponding to one or more moving targets or features corresponding to ambiguous range rate data, and
        the filtering is based on minimal and maximal values for each of a lateral velocity, a longitudinal velocity, and a yaw rate of the vehicle;
    determining, based on the filtered beamvectors, a characteristic of at least one of an environment of the vehicle or of the vehicle itself, wherein the determined characteristic includes information on at least one stationary target; and
    controlling the ADAS based on the determined characteristic.

2. The method of claim 1 wherein the characteristic is information on at least one of stationary targets, moving targets, or an ego-motion of the vehicle.

3. The method of claim 1 wherein the filtering further includes reassigning, from a first beamvector to a second beamvector, features corresponding to ambiguous range rate data.

4. The method of claim 1 wherein the filtering is based on one or more filter windows representing one or more validity regions in motion spectrum space.

5. The method of claim 4 wherein the one or more validity regions includes at least one of:
    a first validity region corresponding to expected motion spectra of stationary targets within a field-of-view of the one or more radar antennas,
    a second validity region corresponding to positive range rate ambiguities resulting from stationary targets within the field-of-view of the one or more radar antennas having a velocity that exceeds an unambiguous velocity interval of the one or more radar antennas, and
    a third validity region corresponding to negative range rate ambiguities resulting from stationary targets within the field-of-view of the one or more radar antennas having a velocity that falls below the unambiguous velocity interval of the one or more radar antennas.

6. The method of claim 5 wherein the filtering is based on convolutions using the beamvectors, the one or more filter windows, and a transformation matrix.

7. The method of claim 1 wherein the radar data includes range data.

8. The method of claim 1 wherein acquiring radar data from each of one or more radar antennas includes processing of time domain data using Doppler processing.

9. The method of claim 1 wherein a size of an unambiguous velocity interval is based on a pulse width of a corresponding transmitted radar signal.

10. The method of claim 1 wherein the at least one stationary target is located in an environment traversed by the vehicle.

11. The method of claim 1 wherein the method includes estimating an ego-motion of the vehicle based on the filtered beamvectors.

12. A data processing apparatus, comprising:
at least one processor, and
memory storing instructions for execution by the at least one processor, wherein the instructions include:
acquiring radar data from each of one or more radar antennas, wherein:
the acquired radar data includes range rate (Doppler) data, and
the one or more radar antennas are mounted on a vehicle;
determining beamvectors from the acquired radar data;
filtering the beamvectors, wherein:
the filtering includes removing, from the beamvectors, at least one of features corresponding to one or more moving targets or features corresponding to ambiguous range rate data, to determine filtered beamvectors, and
the filtering is based on minimal and maximal values for each of a lateral velocity, a longitudinal velocity, and a yaw rate of the vehicle;

determining a characteristic of at least one of an environment of the vehicle or of the vehicle itself based on the filtered beamvectors, wherein the determined characteristic includes information on at least one stationary target; and controlling an advanced driver-assistance system (ADAS) of the vehicle based on the determined characteristic.

13. The vehicle comprising the data processing apparatus of claim 12.

14. A non-transitory computer-readable medium comprising instructions including:
acquiring radar data from each of one or more radar antennas, wherein:
the acquired radar data includes range rate (Doppler) data, and
the one or more radar antennas are mounted on a vehicle;
determining beamvectors from the acquired radar data;
filtering the beamvectors, wherein:
the filtering includes removing, from the beamvectors, at least one of features corresponding to one or more moving targets or features corresponding to ambiguous range rate data, to determine filtered beamvectors, and
the filtering is based on minimal and maximal values for each of a lateral velocity, a longitudinal velocity, and a yaw rate of the vehicle;
determining a characteristic of at least one of an environment of the vehicle or of the vehicle itself based on the filtered beamvectors, wherein the determined characteristic includes information on at least one stationary target; and
controlling an advanced driver-assistance system (ADAS) of the vehicle based on the determined characteristic.

* * * * *